United States Patent
Haataja et al.

[11] Patent Number: 6,138,091
[45] Date of Patent: *Oct. 24, 2000

[54] METHOD AND ARRANGEMENT FOR SIMULTANEOUS RECORDING OF INCOMING AND OUTGOING VOICE SIGNALS WITH COMPRESSION OF SILENCE PERIODS

[75] Inventors: Tero Haataja; Ari Sinisalo, both of Tampere, Finland

[73] Assignee: Nokia Mobile Phones Ltd., Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,499

[22] Filed: Dec. 17, 1997

[30] Foreign Application Priority Data

Dec. 20, 1996 [FI] Finland ..................................... 965150

[51] Int. Cl.⁷ ..................................................... G10L 11/02
[52] U.S. Cl. ........................................... 704/215; 704/278
[58] Field of Search ................................... 704/208, 214, 704/215, 278; 381/119; 369/1, 4; 379/88.28

[56] References Cited

U.S. PATENT DOCUMENTS

| | | | |
|---|---|---|---|
| 4,365,112 | 12/1982 | Ruether et al. | 704/214 |
| 4,658,425 | 4/1987 | Julstrom | 381/81 |
| 5,259,035 | 11/1993 | Peters et al. | 381/110 |
| 5,440,643 | 8/1995 | Wilson et al. | 381/119 |
| 5,550,893 | 8/1996 | Heidari | 379/59 |

FOREIGN PATENT DOCUMENTS

| | | |
|---|---|---|
| 3425026 A1 | 2/1986 | Germany . |
| 08289002 | 11/1996 | Japan . |
| 2254986 | 10/1992 | United Kingdom ............... G10L 9/14 |

OTHER PUBLICATIONS

Patent Abstracts of Japan, Publication No. 06022041 A, Jan. 28, 1994, "Voice Storage Device", Fujitsu Ltd.
Patent Abstracts of Japan, Publication No. 61012155 A, Jan. 20, 1986, "Voice Recording And Controlling System", Nec Corp.
"The GSM System For Mobile Communications" Mouly et al., ISBN 2–9507190–0–7, Palaiseau 1992, 701 pp.

Primary Examiner—David R. Hudspeth
Assistant Examiner—Harold Zintel
Attorney, Agent, or Firm—Perman & Green, LLP

[57] ABSTRACT

This invention relates to a method by means of which more than one audio signal can be recorded in compressed form in a memory element, and to a system implementing such a method. In the system according to the invention, audio signal samples are recorded only when voice is detected in the audio signals. The system according to the invention saves memory capacity required by the recording by combining the audio signal samples when voice is detected in samples of more than one audio signal. Furthermore, an audio signal is not recorded when no voice is detected in the signal. The invention also reduces the average computing capacity needed and thus power consumption, since signal combination, or mixing, is advantageously performed only when voice is detected in the samples of more than one audio signal.

11 Claims, 2 Drawing Sheets

METHOD AND ARRANGEMENT FOR SIMULTANEOUS RECORDING OF INCOMING AND OUTGOING VOICE SIGNALS WITH COMPRESSION OF SILENCE PERIODS

FIELD OF INVENTION

This invention relates to a method by means of which a call can be recorded in compressed form on a memory element, and also to a system realizing such a method.

DISCUSSION OF THE PRIOR ART

It is known to connect a separate tape recorder or such to a telephone apparatus and to record a call on that apparatus. Such a method is rather unwieldy when applied to mobile communication devices because in addition to a tape recorder, also a mixer is needed which combines the incoming and outgoing audio signals into one audio signal to be recorded by the tape recorder. Furthermore, in digital mobile communication systems such as the GSM system, the audio signals have to be converted from digital to analog format before recording, thus increasing the noise level of the audio signal to be recorded. Such a method for recording a call requires several separate devices, which is expensive and impractical.

It is known to record the sound of one call direction at a time in digital format in the memory of a mobile communication device. Such a system is disclosed in the Finnish patent document no. 91457 and in the corresponding British patent document GB 2 254 986. The patent document in question discloses a method for recording voice without pauses. In the method, voice is first converted to digital format by an A/D converter and coded into frames. Frames containing voice are recorded in memory until a voice activity detector detects a pause in the voice. A pause start mark and the length of the pause are recorded memory before recording the next voice frame. By means of such a method voice can be recorded very efficiently since the audio signal is not recorded during pauses. During voice playback, recorded frames are sent to playback means and when a pause mark is encountered the system waits for a period of time corresponding to the recorded pause length information before sending the next frames. The method disclosed in said patent document has the disadvantage that it can only record the sound of one audio source at a time, e.g. the answer message of an automatic telephone answering machine.

SUMMARY OF THE INVENTION

An object of the invention is to provide a method for recording the voices of both parties of a call on a memory means. Another object of the invention is to provide a method for recording the voices of the parties of a call on a memory medium in an efficient manner, saving the capacity of the memory medium. A further object of the invention is to provide a method which requires only a little computing capacity to realize the objects mentioned above.

The objects are achieved by recording the frames formed of an audio signal only when the voice activity detector, of which there may be one or more, detects voice, and by combining the frames formed of the signals from two or more sources and recording the frames representing the combined signal only when said one or more voice activity detector(s) detect(s) voice.

The method according to the invention is characterized by that, which is specified in the characterizing part of the independent method claim. The invention is further directed to a system which is characterized by that, which is specified in the characterizing part of the independent system claim. Dependent claims describe further advantageous embodiments of the invention.

In the system according to the invention, the audio signal samples are recorded only when voice is detected in the audio signals. The system according to the invention saves memory capacity required for the recording by combining the audio signal samples when voice is detected in samples of at least one audio signal. The invention also decreases the average computing capacity required and thus power consumption, too, as the signal combination, or mixing, is advantageously performed only when voice is detected in samples of more than one audio signal.

BRIEF DESCRIPTION OF THE DRAWINGS

The invention is described in more detail referring to the preferred embodiments, presented by way of example, and to the attached drawings, in which.

DETAILED DESCRIPTION

In the method according to a preferred embodiment of the invention the audio signal is recorded in samples of certain length. The samples to be recorded are formed according to the outputs of the voice activity detectors for the transmitted and received audio signals. If voice is detected in both the received and the transmitted signal, the sample is formed of a combination of these signals, produced by summing, for example. If voice is detected only in one signal, the sample is advantageously formed of that signal only. Alternatively, the samples can be combined in this case, too, and the sample of the silent signal can be advantageously replaced by a zero sample, i.e. a sample containing one or more zeroes or other values corresponding to silence. If no voice is detected in either of the signals, neither of the signals will be recorded. Then, a silent period start mark is recorded in the memory means and the length of the silent period is measured and when the silence ends, the silence length information is recorded.

In this patent application, 'voice' means, in addition to the normal definition of voice, also all kinds of sounds possibly appearing in the audio signal, except for background noise.

Figure 1:
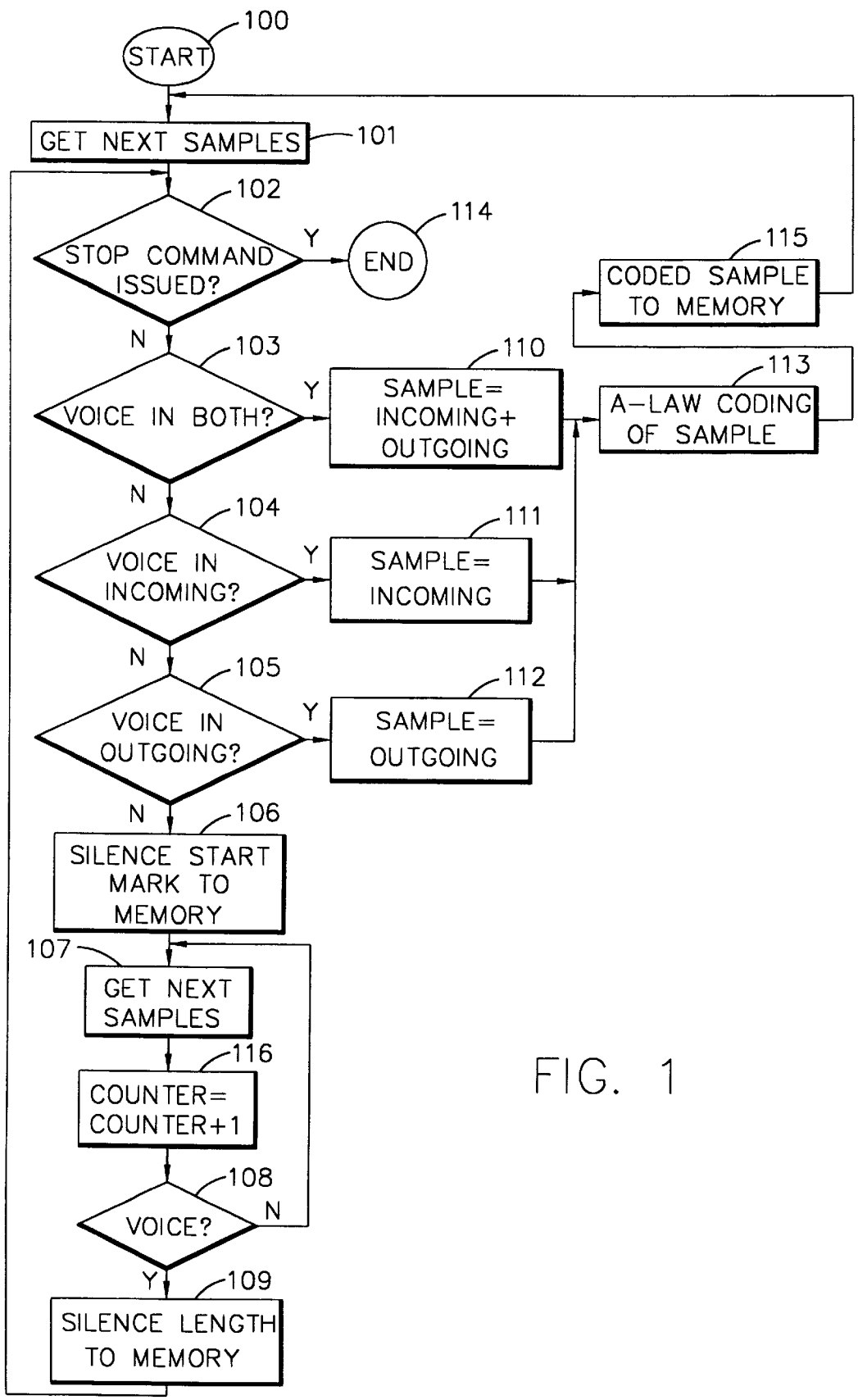
FIG. 1 shows a flow chart of the operation of the system according to the invention.

FIG. 1 shows a flow chart of the operation of an embodiment of the system according to the invention. This example shows the recording of an ordinary call between two parties. A user starts 100 the call recording e.g. by pushing a mobile phone button or by issuing the start recording command in another known manner. Next, the system gets 101 a sample of the incoming audio signal and of the outgoing audio signal spoken by the user. Then the system checks 102 whether the user has issued a stop recording command e.g. by pushing a certain button or in another known manner. Typically, in the beginning of recording this is not the case, so the system next checks 103 the values of the outputs of the voice activity detectors of both audio signals. If both detectors indicate that the signals contain voice, the system generates 110 the sample to be sent to the memory element on the basis of both the sample of the received incoming audio signal and the sample of the outgoing audio signal spoken by the user. In the method according to the invention it is possible to use any method according to the prior art to combine two signal samples and the invention is not limited to the use of any particular combination method. The sample thus generated is encoded 113 in order to decrease the recording memory required, and sent 115 to the memory element, whereafter the execution returns to step 101. The method according to the invention can advantageously employ A-law coding. However, the invention is not limited to the use of A-law coding, but the method and system according to the invention can also use other coding and compression methods according to the prior art, such as the methods used in the GSM system. The coding methods used in the GSM system and the GSM system architecture are described e.g. in "The GSM System for Mobile Communications" by Michel Mouly and Marie-Bernadette Pautet, published by the authors, ISBN 2-9507190-0-7, Palaiseau 1992, 701 pp.

If in step 103 voice was not detected by both detectors, the system next checks 104 whether the voice activity detector of the incoming audio signal detects voice. If voice is detected in the incoming signal, the incoming audio signal sample is set 111 as the sample to be recorded. The sample to be recorded is encoded 113 in an A-law coder and sent 115 to the memory element, whereafter the execution returns to step 101.

If in step 104 the voice activity detector of the incoming audio signal did not detect voice, the system next checks 105 whether the voice activity detector of the outgoing audio signal detects voice. If voice is detected in the outgoing signal, the outgoing voice sample is set 111 as the sample to be recorded. The sample to be recorded is encoded 113 in an A-law coder and sent 115 to the memory element, whereafter the execution returns to step 101.

If in step 105 the voice activity detector of the outgoing audio signal did not detect voice, a silence start mark is sent 106 to the memory element. Next, the system gets 107 a sample of the incoming audio signal and of the outgoing audio signal spoken by the user and increments 116 by one the value of the counter measuring the length of the silence. If no voice is detected in the samples fetched in step 107, the system returns to step 107 and fetches the next samples. Steps 107, 116 and 108 are repeated until voice is detected in the sample of at least one audio signal, whereafter the system records 109 the length of silence in the memory element, resets the counter measuring the length of silence (for clarity this step not shown in FIG. 1) and returns to step 102.

The sequence described above is repeated until the user issues the stop recording command, the memory reserved for the recording runs out, the call is disconnected, the connection is broken, or a predetermined time limit set for the recording is reached, for example.

In the previous example, the recording is ended when the connection breaks for any reason, or if the other party, or the user disconnects the call. However, this is not intended as a limitation of the invention. In another advantageous embodiment of the invention, the recording is continued after such an event, until the user ends the recording for example by giving a corresponding command via the user interface, e.g. a keypad, of a mobile communication means. In this embodiment, the broken or disconnected call preferably affects the recording in a similar way as the silence of the other party. For example, only the speech signal of the user is recorded, or the speech signal of the user is mixed with a signal corresponding to silence. This embodiment has the advantage, that the user may add final comments to the recording after the call is broken or disconnected.

Advantageously the system checks in step 116 that the counter value does not exceed a certain limit that depends on the implementation of the embodiment. For example, in GSM mobile stations the audio signal is represented by 13 bits, so that after the A-law coding in step 113 the coded sample to be recorded in the memory element can be represented by 8 bits which is an advantageous length for a memory element word. Then, the counter for the length of silence is advantageously an 8-bit element, too, in which case it can count 255 silent samples at the most. If the counter reaches the maximum value, the system can e.g. send to the memory element the counter's maximum value and a new silence start mark and reset the counter to start the counting from the beginning.

It is possible to use in step 113, instead of the A-law coding, another known signal compression method, such as $\mu$-law coding, adaptive differential pulse code modulation (ADPCM) or GSM FR coding. The coding element used in step 113 can be e.g. a coding element found in the mobile station used to encode the audio signal sent to the radio path, or a separate coding element designed especially for recording.

Figure 2:
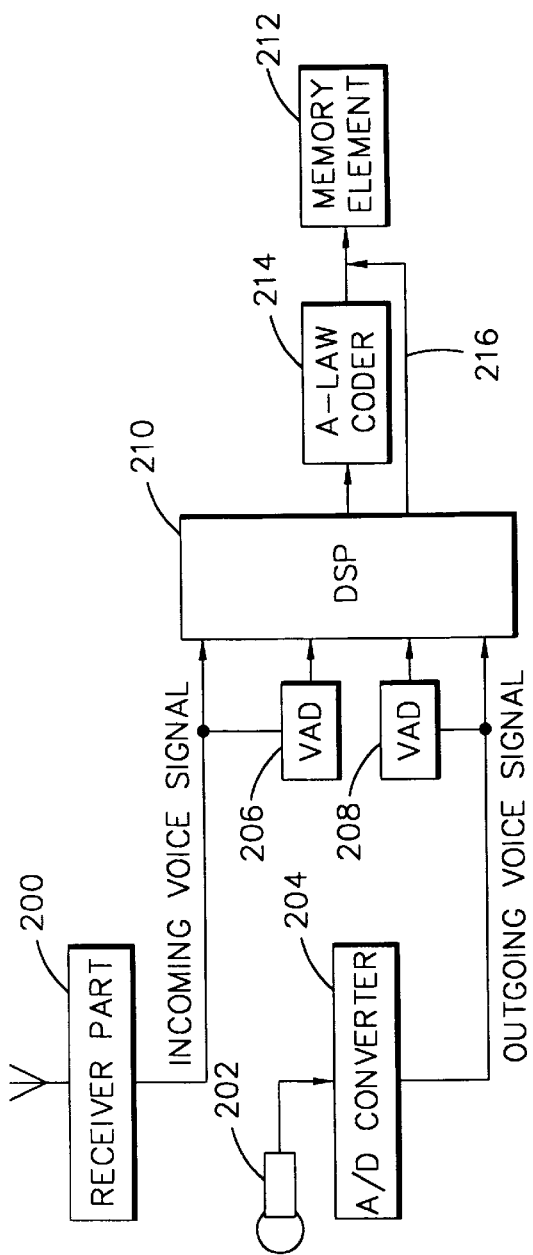
FIG. 2 shows a block diagram of a preferred embodiment of the invention.

FIG. 2 shows a block diagram of a preferred embodiment of the invention which can be used in GSM mobile stations, for example. A receiver part 200 receives an incoming transmission and converts the audio signal included in the frames of the GSM base station signal to 13-bit digital samples that are taken to the voice activity detector 206 of the incoming audio signal and to a digital signal processor (DSP) 210. The voice of the mobile station user spoken into a microphone 202 is converted in an A/D converter 204 to digital samples which are taken to the voice activity detector 208 of the outgoing audio signal and to the digital signal processor 210. The outputs of detectors 206, 208 are functionally connected to the digital signal processor 210. The blocks of the flow chart shown in FIG. 1 can be advantageously realized as programs in the digital signal processor 210. The digital signal processor 210 generates the samples to be recorded from the samples of the incoming audio signal, from the samples of the outgoing audio signal, or from both, and sends the recorded samples via an A-law coder 214 to a memory element 212. The digital signal processor 210 also calculates the lengths of silent pauses and sends 216 the silent pause start marks and the measured lengths to the memory element 212 without coding in the coder 214. For reasons of clarity, FIG. 2 only shows those parts of a mobile communication means necessary to illustrate the embodiment.

In the example depicted by FIG. 2, two incoming audio signals are monitored by two separate voice activity detectors 206, 208. There may be more than two audio signals to be recorded. In addition, a voice activity detector or an equivalent audio signal monitoring element can be set to monitor more than one audio signal. Such voice activity detectors or equivalent audio signal monitoring elements can also be realized as programs in the digital signal processor 210. On the other hand, instead of the customary digital signal processor 210 the system may comprise a special mixer element 210 controlled at least by one audio signal monitoring element which mixes audio signal samples when voice is detected in more than one audio signal and copies samples of only one audio signal to its output when voice is detected in the samples of that one audio signal only. The playback of a recorded call can be effected in a similar way.

During the playback, a voice activity monitor may monitor, if the mobile station user speaks or not. If the user speaks, the speech signal is mixed with the signal being played back in a mixer element. If the user does not speak, the mixer element may copy the played back signal to its output, or mix the played back signal with a zero signal, i.e. a signal having with zero values or other values corresponding to silence.

The playback of a recorded call can also be arranged e.g. in such a way that coded audio signal samples are fetched from the memory element 212, monitoring at the same time whether there is a silence start mark among the samples. The coded audio signal samples are decoded in an A-law decoder, whereafter the samples are sent to the desired signal input, e.g. via an A/D converter to a loudspeaker or external amplifier system, or possibly via the mobile station's transmitter part to the other party of the call. If a silence start mark is detected among the samples, the silence length information is read from the memory element and the reading of samples from the memory element 212 is interrupted for the duration of the silence.

Figure 3:
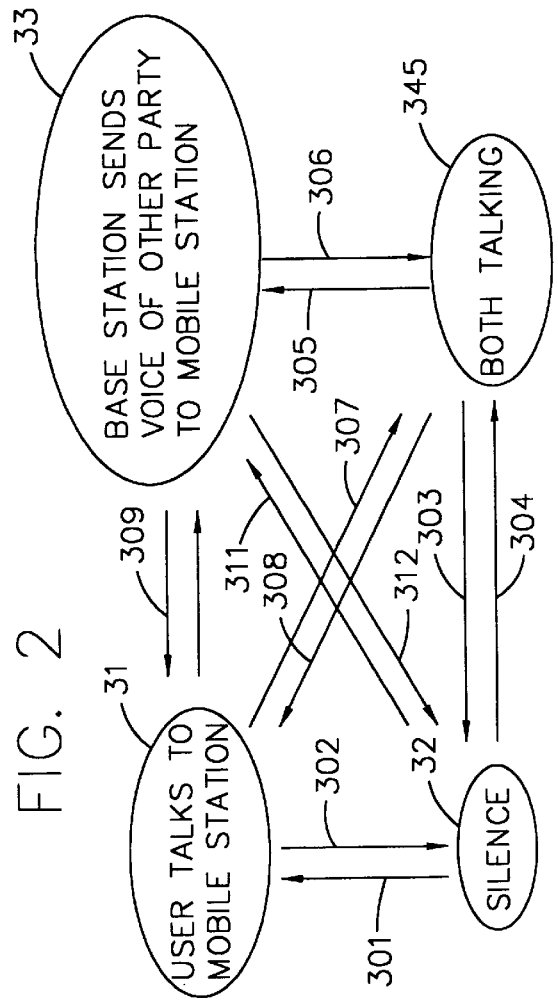
FIG. 3 shows a state diagram of the operation of a preferred embodiment of the invention.

FIG. 3 shows a state diagram of the operation of a preferred embodiment of the invention in a situation where the voices of the two parties of a call are recorded. The operation can be represented as a four-state state machine according to FIG. 3. The state diagram of FIG. 3 can be used e.g. to depict the operation of the embodiment shown in FIG. 2. The states are as follows:

31 the mobile station user talks to the mobile station,
32 silence, both parties are silent,
33 the other party is talking, and
34 both parties are talking.

In state 31, in which only the mobile station user is talking, samples of the voice of the mobile station user are recorded in the memory element. In state 32, no signal samples are recorded at all, but the system is measuring the length of the pause. In state 33, the other party is talking, and samples of the voice of the other party are recorded in the memory element. In state 34, both parties are talking, and the samples of the audio signals of both parties are combined and the combined samples are recorded in the memory element.

Transition 301 occurs when the user of the mobile station starts talking. The systems sees this as activation of the voice activity detector monitoring the voice of the user of the mobile station. The system then records in the memory element the length of the silent period.

Transition 302 occurs when the user of the mobile station stops talking. The system sees this as deactivation of the voice activity detector monitoring the voice of the user of the mobile station. The system then records in the memory element the silent period start mark.

Transition 303 occurs when both parties of the call stop talking. The system sees this as deactivation of both voice activity detectors. The system then records in the memory element the silent period start mark.

Transition 304 occurs when both parties start talking. The system sees this as activation of both voice activity detectors. The system then records in the memory element the length of the silent period.

Transition 305 occurs when the user of the mobile station stops talking in a situation where the other party is talking. The system sees this as deactivation of the voice activity detector monitoring the voice of the user of the mobile station.

Transition 306 occurs when the user of the mobile station starts talking when the other party is talking. The system sees this as activation of the voice activity detector monitoring the voice of the user of the mobile station.

Transition 307 occurs when the other party starts talking in a situatione where the user of the mobile station is talking. The system sees this as activation of the voice activity detector monitoring the voice of the other party.

Transition 308 occurs when the other party stops talking in a situation where the user of the mobile station is talking. The system sees this as deactivation of the voice activity detector monitoring the voice of the other party.

Transition 309 occurs when the other party stops talking at the same time as the user of the mobile station starts talking. The system sees this as deactivation of the voice activity detector monitoring the voice of the other party and as activation of the detector monitoring the voice of the user of the mobile station.

Transition 310 occurs when the other party starts talking at the same time as the user of the mobile station stops talking. The system sees this as activation of the voice activity detector monitoring the voice of the other party and as deactivation of the detector monitoring the voice of the user of the mobile station.

Transition 311 occurs when the other party starts talking. The system sees this as activation of the voice activity detector monitoring the voice of the other party. The system then records the length of the silent period in the memory element.

Transition 312 occurs when the other party stops talking. The system sees this as deactivation of the voice activity detector monitoring the voice of the other party. The system then records the silent period start mark in the memory element.

The method according to the invention is not limited to recording the voices of two parties, but the method according to the invention can also be used for recording a so-called conference call with several parties. The system according to the invention can be used to record more than two separate audio signals, in which case the system comprises one voice activity detector per each audio signal to be recorded and the sample to be recorded is generated in the manner described above from the samples of the audio signals in which voice is detected.

In the method according to the invention, signal mixing and the computing capacity of the digital signal processor required by said mixing are needed only when the parties of a call talk at the same time, which saves computing capacity required and also power consumed by the system. Furthermore, a separate analog mixer need not be added to the analog parts of the mobile station in order to record a call.

The system according to the invention can be easily added to current mobile stations as most of the functions of the system can be realized as programs in the digital signal processor typically found in mobile stations. Some mobile station models already have the memory capacity required by the system according to the invention, and adding the memory capacity required is not expensive at the current prices of memory circuits.

It is obvious to a person skilled in the art that the various embodiments of the invention are not limited to the examples described above but they can be modified within the scope of the claims set forth below.

In the claims attached hereto, 'signal' means the output signal of an audio source, possibly including silent pauses, plain background noise, or voice or music, for example. In the claims attached hereto, 'voice' means in addition to the normal definition of voice, also other sounds in the signal to be recorded, different from background noise, such as music and sounds of machines, but specifically not background noise.

What is claimed is:

1. A method for recording in a memory element at least two digital signals having samples of a constant duration containing information bits, wherein a first of said at least two digital signals is an incoming voice channel and a second of said at least two digital signals is an outgoing voice channel, comprising steps in which:

if voice is detected in a sample of one signal of said at least two digital signals, a sample formed of the sample of said one signal is recorded in the memory element, and if no voice is detected in any of the signals of said at least two digital signals, a special silent period start mark is recorded in the memory element whereafter, when voice is again detected in a sample of any signal of said at least two digital signals, the information about the length of the silent period is recorded in the memory element, wherein, upon a detection of voice activity concurrently in a first concurrent signal and in a second concurrent signal of said at least two digital signals, there is a step of forming from a voice sample of said first concurrent signal and a voice sample of said second concurrent signal a sample to be stored in said memory element.

2. The method of claim 1 comprising steps in which, if voice is detected in a sample of any one signal of said at least two digital signals only, the sample recorded in the memory element is the sample of that signal.

3. The method of claim 1 comprising steps in which, if voice is detected in samples of more than one signal of said at least two digital signals, the sample to be recorded in the memory element is formed of a combination of those signal samples in which voice is detected.

4. The method of claim 1 comprising steps in which the sample to be recorded in the memory element is formed of at least a first signal sample of said at least two digital signals wherein voice is detected, and at least a second signal sample of said at least two digital signals wherein no voice is detected, there being a step of combining said first signal sample with said second signal sample, so that the value of said second signal sample in which no voice is detected is set to a value corresponding to silence before the signal samples are combined to form the sample to be recorded.

5. The method of claim 1 further comprising a step of compressing the samples to be recorded before recording in the memory element in order to reduce the memory capacity required.

6. A method according to claim 1 wherein said step of forming a sample to be stored is accomplished by circuitry in a mobile communication device.

7. A system for recording at least two digital signals comprising samples of constant duration which contain information bits, wherein a first of said at least two digital signals is an incoming voice channel and a second of said at least two digital signals is an outgoing voice channel, the system comprising;

a mixer element for combining at least part of the signal samples of said at least two digital signals for the recording, a coding element functionally connected to the output of the mixer element for encoding signal samples coming from the output of the mixer element in order to reduce the memory capacity required for the recording of signal samples, and a memory element functionally connected to the output of the coding element for recording the encoded signal samples.

8. The system of claim 7 comprising at least one monitoring element for monitoring at least one signal of said two digital signals, a mixer element for copying samples of only one signal of said at least two digital signals to its output when said at least one monitoring element detects voice in the samples of said one signal only.

9. The system of claim 7 comprising at least one monitoring element for monitoring at least one signal of said two digital signals, wherein said mixer element is operative for combining the samples of at least two signals of said at least two digital signals, and for placing a combined sample at its output when said at least one monitoring element detects voice in the samples of said one signal only.

10. The system of claim 9 comprising a mixer element for setting the values of signal samples of said at least two digital signals in which said at least one monitoring element does not detect voice to a value corresponding to silence, before a combination of signals to be mixed.

11. A system according to claim 7 wherein said mixer element, said coding element, and said memory element constitute portions of circuitry in a mobile communication device.

* * * * *